United States Patent
Inoue

(10) Patent No.: US 6,219,405 B1
(45) Date of Patent: Apr. 17, 2001

(54) METHOD AND APPARATUS FOR SENSING AN IMAGE

(75) Inventor: Hitoshi Inoue, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/012,969

(22) Filed: Jan. 26, 1998

(30) Foreign Application Priority Data

Jan. 27, 1997 (JP) ................................................. 9-012594

(51) Int. Cl.$^7$ .................................................... H05G 1/08
(52) U.S. Cl. ....................... 378/98.8; 378/98.12; 378/207
(58) Field of Search ............................... 378/98.8, 98.7, 378/98.12, 207

(56) References Cited

U.S. PATENT DOCUMENTS

| 4,602,291 | 7/1986 | Temes ..................................... 358/221 |
| 5,237,446 | * 8/1993 | Takahashi ............................. 359/359 |
| 5,452,338 | 9/1995 | Granfors et al. ................... 378/98.11 |
| 5,604,781 | 2/1997 | Suzuki et al. ........................... 378/62 |
| 5,755,501 | * 5/1998 | Shinohara et al. ..................... 353/31 |
| 5,864,146 | * 1/1999 | Karellas ............................... 378/98.8 |

FOREIGN PATENT DOCUMENTS

| 196 04 631 | 8/1996 | (DE) . |
| 196 15 178 | 10/1997 | (DE) . |
| 0857983 | 8/1998 | (EP) . |
| 08266532 | 10/1996 | (JP) . |

* cited by examiner

*Primary Examiner*—Robert H. Kim
*Assistant Examiner*—Drew A. Dunn
(74) *Attorney, Agent, or Firm*—Fitzpatrick, Cella, Harper & Scinto

(57) ABSTRACT

An image sensing apparatus using a solid state image sensor has the capability of correcting an image signal including an intensity variation due to the variation in the intensity of a radiation from a radiation source and also including an intensity variation due to the variation in conversion efficiency of photoelectric conversion elements in such a manner that only the variation in conversion efficiency is corrected thereby suppressing an artifact which would occur in conventional apparatus. A shading distribution (distribution data) is measured by sensing an X-ray through no object to be examined or through an object whose transmittance to the X-ray is well known. The component of the X-ray intensity distribution is separated from the obtained shading distribution data thereby obtaining a pixel-to-pixel variation in conversion efficiency of the solid state image sensor. The image signal is corrected based on the pixel-to-pixel variation in conversion efficiency obtained.

13 Claims, 6 Drawing Sheets

METHOD AND APPARATUS FOR SENSING AN IMAGE

BACKGROUND OF THE INVENTION

The present invention relates to a method and apparatus for sensing an image using a solid state image sensor including a plurality of pixels, and more particularly, to a method and apparatus for correcting an image, suitable for use with an X-ray image sensing apparatus.

With recent advances in the technology of image sensing apparatus, it has become possible to realize a large-sized image sensing apparatus using a great number of photoelectric conversion elements, and capable of sensing a high-quality large-area image with a high resolution. Such recent advances in the technology also make it possible to acquire radiation image information such as an X-ray image for use in medical examination directly through a high-resolution and large-sized image sensing apparatus instead of using a conventional silver halide film. Such radiation image information may be converted into digital electronic information for further various processing.

FIG. 1 is a simplified block diagram illustrating an example of the basic structure of an X-ray image sensing apparatus using a solid state image sensor. In FIG. 1, reference numeral 1 denotes an X-ray generator, 2 denotes a fluorescent plate for converting an X-ray to visible light, 3 denotes an optical system, and 4 denotes a solid state image sensor.

The X-ray generated by the X-ray generator 1 passes through an object 15 to be examined, if there is such an object, and incident on the fluorescent plate 2. If there is no object, the X-ray is directly incident on the fluorescent plate 2. The fluorescent plate 2 serves as a wavelength converter for converting the X-ray to light with a wavelength sensible by the solid state image sensor 4.

The fluorescent light generated by the fluorescent plate 2 is focused via the optical system 3 onto a two-dimensional solid state image sensor 4 which senses image information using a CCD or a similar device comprising a plurality of photoelectric conversion elements.

Reference numeral 8 denotes a clock generator for generating a basic clock signal by which the two-dimensional solid state image sensor 4 and other circuit devices are driven. Reference numeral 9 denotes a control signal generator for generating various control signals on the basis of the clock signal. Reference numeral 5 denotes an analog-to-digital (A/D) converter for converting the signal output by the solid state image sensor 4 to a digital signal, which is supplied over a signal line 12. Reference numeral 10 denotes a device including a memory (dark output data memory) for storing the data representing the level (dark level) of the signal output by the solid state image sensor 4 when there is no input signal. In normal operation, a subtractor 6 subtracts the dark level from the signal output from the solid state image sensor 4, and outputs the resultant signal over a signal line 13. Reference numeral 11 denotes a device including a memory (shading memory) for storing image data obtained when there is no object such as a human body 15 to be examined. This data represents the shading distribution including the variation in the conversion efficiency from one photoelectric conversion element to another of the solid state image sensor 4. A divider 7 divides actual image data taken in a normal mode by the data stored in the memory 11 so as to make a correction in terms of the shading effect including the variation in the conversion efficiency of the photoelectric conversion elements. The corrected data is output over a signal line 14.

When an actual X-ray image is taken, the solid state image sensor is first driven under the condition that no X-ray is generated, and the obtained dark output signal is stored in the dark output data memory 10. Then an X-ray is generated under the condition that there is no object such as a human body to be examined, and an image signal is taken via the solid state image sensor 4. The image data is reduced by an amount corresponding to the dark output data, and the result, which includes the shading effect and the variation in the conversion efficiency of the photoelectric conversion elements, is stored in the shading memory 11.

If it is assumed that an X-ray is incident on the fluorescent plate with uniform energy across the fluorescent plate, and if the X-ray is converted by the fluorescent plate to visible light with uniform conversion efficiency, then it is expected that the solid state image sensor 4 will provide an equal output signal for all pixels. Under the above conditions, if there is a variation in the output signal when there is no object to be examined, the variation in the output signal can be considered to arise from the variation in the conversion efficiency of the photoelectric conversion elements. If this output signal is reduced by an amount corresponding to the output signal which is output from each photoelectric conversion element when there is no incident X-ray, then the result represents the net output of each photoelectric conversion element for the maximum incident energy of the X-ray.

From this net output signal, it is possible to obtain shading data, although the data usually includes the variation in the conversion efficiency of the photoelectric conversion elements.

In the next step to obtain image information, an image is taken under the condition that there is an object such as a human body to be examined. The subtractor 6 removes the dark output from the image signal, and furthermore the divider 7 corrects the image signal in terms of the shading effect and the variation in the conversion efficiency of the photoelectric conversion elements. The corrected signal is output over the signal line 14.

In the conventional technique described above, it is required to generate an X-ray to obtain correction information about the shading effect and the variation in the conversion efficiency of the photoelectric conversion elements. If the X-ray is generated to obtain correction information each time an image is taken, the life of an X-ray tube is wasted by the nonessential operation. Furthermore, such an operation for obtaining correction information whenever an image is taken results in a great increase in the operation time. Thus it is desirable that the operation of obtaining correction information about the shading effect and the variation in the sensitivity of the photoelectric conversion elements be performed at rather long time intervals, such as once every day.

In general, however, the location of the X-ray generator relative to the location of the image sensing apparatus is moved from time to time during a day for convenience of examinations. This can cause a substantial change in the shading condition.

FIG. 2 is an one-dimensional illustration of a change in the shading shape due to a change in the position of the X-ray generator. In FIG. 2, the horizontal axis represents the pixel positions, and the vertical axis represents the output of the photoelectric conversion elements. Data 31 represents the initial shading shape, and data 32 represents the shading shape obtained after the X-ray generator is moved from the initial location. As can be seen, variations occur over the entire shading shape.

In practice, the distribution of X-ray radiation intensity is not uniform but rather gradually varies such that the intensity becomes maximum near the central position, as represented by curves 31' and 32'. Furthermore, small variations in the photoelectric conversion efficiency from pixel to pixel are superimposed on the X-ray radiation distribution 31' or 32', and thus the overall distribution can be represented by an upward convex curve including small fluctuations as is the case in data 31 and 32 shown in FIG. 2.

That is, data 31 and 32 represent the overall shading characteristic at respective locations of the X-ray generator. In FIG. 2, line 33 represents the output obtained by performing the correction process described above. Although small variations due to the variations in the conversion efficiency from one photoelectric conversion element to another are well corrected on the basis of the correction data obtained for the respective locations of the photoelectric conversion elements, the difference between data 31 and 32 due to the shift of the X-ray intensity distribution results in an undesirable slope in the overall characteristic.

This can be understood by the fact that when there are two functions both having a similar shape which is smooth and upward convex, if the center of one function is shifted from the center of the other, and if one function is divided by the other, then the relative value inverts at a point where the two functions intersect each other.

As described above, the X-ray intensity distribution produces an undesirable effect in the corrected data. This effect can result in an artificial and unnatural modification in the image data. Because the image data taken through the solid state image sensor is used in all the following processes, it is desirable that the image data include no undesirable modification.

SUMMARY OF THE INVENTION

It is an object of the present invention to provide an image sensing apparatus using photoelectric conversion elements and having the capability of correcting an image signal containing a distribution of radiation from a radiation source and variation distribution of the conversion efficiency of the photoelectric conversion elements in such a manner that only the variation distribution of the conversion efficiency is corrected thereby preventing an artifact from occurring in the corrected image data.

It is another object of the present invention to provide an image sensing apparatus provided with a solid state image sensor having a plurality of pixels, wherein the image sensing apparatus has the capability of separating the component of the incident ray intensity distribution from the initial shading data of the apparatus which has been set to arbitrary initial conditions thereby extracting the fluorescent characteristic of a fluorescent plate and the pixel-to-pixel variations in the conversion efficiency of a solid state image sensor.

It is still another object of the present invention to provide a method and apparatus for sensing an image, in which a sensed image is corrected in such a manner that only the variations in the fluorescent characteristic of the fluorescent plate and the photoelectric conversion efficiency are corrected on the basis of the data representing the pixel-to-pixel variation distribution of the conversion efficiency without making no correction in terms of the radiation intensity distribution, thereby preventing an artifact from occurring in the corrected image data.

It is still another object of the present invention to provide a method and apparatus for sensing an image in which when an image such as an X-ray image is taken through a solid state image sensor including a plurality of photoelectric conversion elements, even if the X-ray intensity distribution varies due to movement in position of an X-ray generator or the solid state image sensor, no artifact such as unnaturally sloped shading occurs because correction is performed only in the terms of the variations in the conversion efficiency of the photoelectric conversion elements.

According to an aspect of the present invention, there is provided a method of sensing an image using an image sensing apparatus provided with a solid state image sensor having a plurality of pixels, the method comprising the steps of:

separating the component of an electromagnetic wave radiation intensity distribution from distribution data obtained when an electromagnetic wave is incident on the solid state image sensor thereby obtaining a pixel-to-pixel variation distribution of the conversion efficiency of the solid state image sensor; and correcting image data obtained in an image sensing operation, on the basis of the pixel-to-pixel variation distribution of the conversion efficiency.

According to another aspect of the present invention, there is provided an image sensing apparatus provided with a solid state image sensor having a plurality of pixels, the apparatus comprising:

means for separating the component of an electromagnetic wave radiation intensity distribution from distribution data obtained when an electromagnetic wave is incident on the solid state image sensor thereby obtaining a pixel-to-pixel variation distribution of the conversion efficiency of the solid state image sensor;

means for storing the variation distribution of the conversion efficiency; and means for correcting an image obtained in an image sensing operation, on the basis of the variation distribution of the conversion efficiency.

In the above method and apparatus, the electromagnetic wave may be an X-ray.

In the above method, the step of separating the radiation intensity distribution may be accomplished by determining a function including separate terms approximately representing the radiation distribution and the variation distribution of the conversion efficiency, respectively, thereby separating the radiation distribution. Alternatively, the step of separating the radiation intensity distribution may also be accomplished by passing the distribution data through a two-dimensional low-pass filter thereby achieving the separation.

In the above method, the step of separating the radiation intensity distribution may also be accomplished by: measuring the distribution data for a plurality of shifted positions of the solid state image sensor; extracting, from the distribution data obtained for the plurality of shifted positions, a component which remains unchanged regardless of the shift in the position of the solid state image sensor; and employing the obtained component as the variation distribution of the conversion efficiency.

The determination of the function may include the step of performing non-linear regression analysis or other regression analysis.

In the above apparatus, the means for separating the radiation intensity distribution may include means for determining a function including separate terms approximately representing the radiation distribution and the variation distribution of the conversion efficiency, respectively, thereby separating the radiation distribution. Alternatively, the means for separating the radiation intensity distribution may include a two-dimensional low-pass filter whereby the separation is accomplished by passing the shading distribution data through the two-dimensional low-pass filter. Still alternatively, the means for separating the radiation intensity distribution may include means for measuring the distribution data for a plurality of shifted positions of the solid state image sensor, extracting, from the distribution data obtained for the plurality of shifted positions, a component which remains unchanged regardless of the shift in the position of the solid state image sensor, and employing the obtained component as the variation distribution of the conversion efficiency.

Preferably, the apparatus includes a wavelength converting member for converting the wavelength of the electromagnetic wave, wherein the wavelength converting member is disposed at the side of the solid state image sensor on which the electromagnetic wavelength is incident.

With the image sensing apparatus provided with a solid state image sensor having a plurality of pixels, according to the present invention, it is possible to separate the component of the incident ray intensity distribution from the initial shading data of the apparatus which has been set to arbitrary initial conditions thereby extracting the fluorescent characteristic of a fluorescent plate and the pixel-to-pixel variations in the conversion efficiency of a solid state image sensor. Thus, when a sensed image is corrected, it is possible to correct only the variations in the photoelectric conversion efficiency on the basis of the data representing the pixel-to-pixel variation distribution of the conversion efficiency without making no correction in terms of the radiation intensity distribution, thereby preventing an artifact from occurring in the corrected image data.

In the present invention, it is possible to separate the intensity distribution of radiation such as an X-ray and the pixel-to-pixel variation in the conversion efficiency of the photoelectric conversion elements of the solid state image sensor from a general shading characteristic, and thus it is possible to correct only the variation distribution of the photoelectric conversion elements without correcting the radiation intensity distribution thereby suppressing an artifact such as unnaturally sloped shading due to movement in position of the X-ray tube.

In the specific example shown in FIG. 2, 31' and 32' represent the X-ray intensity distributions contained in data 31 and 32, respectively. In each case, small fluctuations (variations in the conversion efficiency of photoelectric conversion elements) are removed by the correction according to the present invention, and only gradually-varying distribution (radiation intensity distribution) remains as represented by 31' and 32'. Gradually-varying radiation intensity distribution is due to movement in position of the X-ray tube and exists also in images obtained by the conventional technique using a silver halide film. The removal of such radiation intensity is not important. However, it is more important to prevent an artifact such as that denoted by reference numeral 33 from occurring in the corrected image signal. In view of the above, the present invention provides a method and apparatus in which no such an artifact occurs.

DESCRIPTION OF THE PREFERRED EMBODIMENTS

Figure 1:
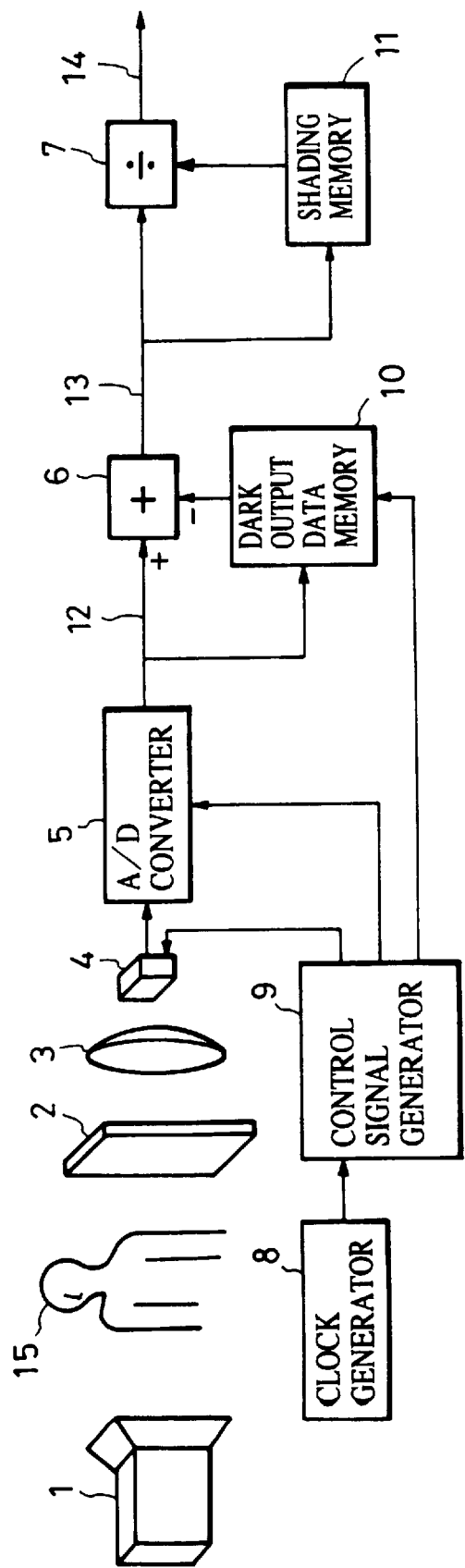
FIGS. 1 (prior art), 3, and 6 are simplified block diagrams illustrating examples of image sensing apparatus.
Figure 2:
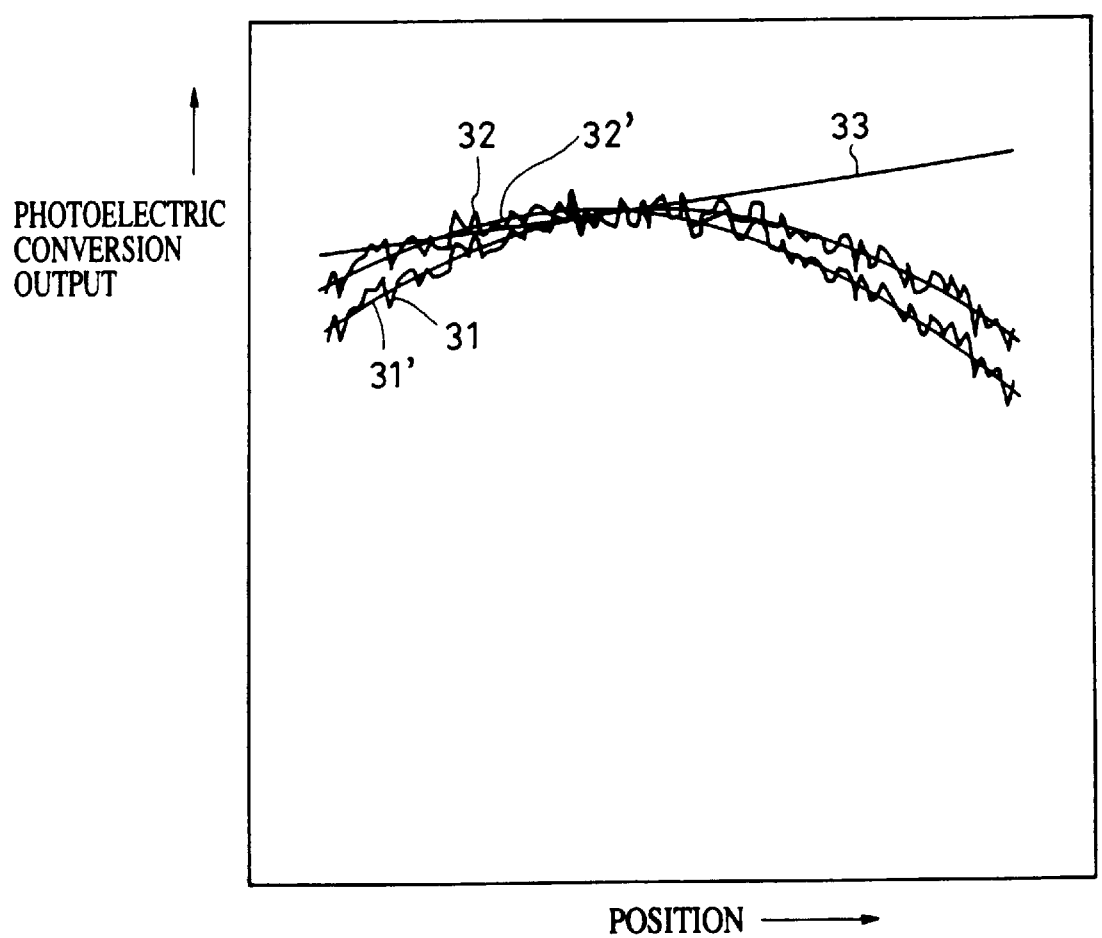
FIG. 2 is a graph illustrating an artifact which occurs when the shading characteristic varies.

First, an example of a method of the calculation performed by the above-described means according to the present invention will be described below.

When an X-ray is emitted from a point source, the X-ray radiation intensity varies in inverse proportion to the square of the distance. Thus, the distribution of the X-ray radiation can be represented by the following simple equation:

$$H(x, y)=K/\{(x-x_o)^2 +(y-y_0)^2+L^2\} \quad (1)$$

where x and y are coordinates taken across the image sensing apparatus, K is the radiation intensity at the point source, L is the distance to the image sensing apparatus, and $x_0$ and $y_0$ are the coordinates of the point source measured from the imaging plane.

In practice, any X-ray tube cannot be regarded as a point source, and therefore the actual distribution of the X-ray radiation intensity is more complicated. However, the distribution is still smooth in variation.

When there is no object such as a human body to be examined, if the X-ray radiation is detected by the solid state image sensor, then the output of the image sensing apparatus will be given by:

$$P(x_i, y_j)=H(x_i, y_j)\times G(x_i, y_j) \quad (1\leq i\leq n, 1\leq j\leq m) \quad (2)$$

where $H(x_i, y_j)$ is the X-ray radiation intensity and the $G(x_i, y_j)$ is the sensitivity of the respective photoelectric conversion elements of the solid state image sensor represented as a function of the location (x, y) of the photoelectric conversion elements, n is the number of solid state image sensor elements counted in the x direction, and m is that counted in the y direction.

Taking the logarithm of equation (2) yields:

$$\log(P(x_i, y_j))=\log(H(x_i, y_j))+\log(G(x_i, y_j)) \quad (3)$$

The output $P(x_i, y_j)$ of the image sensing apparatus represented by equation (3) in the logarithmic form includes a high-frequency component corresponding to small variations arising from the variations in the sensitivity $\log(G(x_i, y_j))$ of the photoelectric conversion elements, and also includes a gradual variation corresponding to the X-ray intensity distribution $\log(H(x_i, y_j))$.

The term $\log(G(x_i, y_j))$ representing the variation in the sensitivity of the photoelectric conversion elements and the term $\log(H(x_i, y_j))$ representing the variation in the X-ray radiation intensity can be isolated form each other in many ways. For example, $\log(G(x_i, y_j))$ is assumed to be substantially independent of the X-ray radiation intensity distribution, and $H(x_i, y_j)$ is assumed to be given by equation (1), then parameters K, $x_0$, $y_0$, and L can be determined by means of non-linear regression analysis so that the following value is minimized:

$$\Sigma_{(i, j)}(\log (P(x_i, y_i))-\log(H (x_i, y_i)))^2$$

This calculation is not necessarily required to be performed for all points, but may be performed for representative points (for example for every few points).

If it is difficult to apply non-linear regression analysis, regression analysis may be performed, for example, on the assumption that H(x, y) is a polynomial plane in which x and y are independent of each other. More specifically, the following relation (4) is assumed and parameters $a_k$, $b_k$, and c ($1 \leq k \leq P$) may be determined from linear regression associated with $\log(P(x_i, y_i))$:

$$\log(H(x_i, y_i)) = \Sigma a_k x^k + \Sigma b_k y^k + c \quad (4)$$

where E represents the sum taken from k=0 to p, and p is the degree of the polynomial.

When it is difficult to determine the function, the data of $\log(P(x_i, y_i))$ may be passed through a two-dimensional low-pass filter so as to remove spikes, and resultant data $\log(H(x_i, y_i))$ including no abrupt changes may be subtracted from $\log(P(x_i, y_i))$ to obtain $\log(G(x_i, y_i))$ Alternatively, $\log(H(x_i, y_i))$ may also be processed as follows. the location of the X-ray tube or the solid state image sensor is moved by an amount corresponding to one pixel in a horizontal or vertical direction, and two different patterns associated with the output signal are taken. If the component included in common in both patterns is extracted, then the result represents the variation in the sensitivity of the photoelectric conversion elements of the solid state image sensor.

That is, if the pattern in equation (3) is shifted in the x direction by one pixel, then the original pattern $P(x_i, y_j)$ and the shifted pattern $P'(x_i, y_j)$ are given as follows:

$$\log(P(x_i, y_j)) = \log(H(x_i, y_j)) + \log(G(x_i, y_j)) \quad (5)$$

$$\log(P'(x_1, y_j)) = \log(H(x_{i+1}, y_j)) + \log(G(x_i, y_j)) \quad (6)$$

If equation (6) is shifted in the opposite direction, then $$\log(P'(x_i, y_j)) = \log(H(x_i, y_j)) + \log(G(x_{i-1}, y_j)) \quad (7)$$

From equations (5) and (7), the following equation can be obtained:

$$\log(G(x_i, y_j)) = \log(P(x_i, y_j)) \cdot \log(P'(x_{i-1}, y_j)) \quad + \log(G(x_{i-1}, y_j))$$

$$(2 \leq i \leq n,\ 1 \leq j \leq m,\ \log(G(x_i, y_j)) = K_j) \quad (8)$$

where $K_j$ is a constant given for each row.

The overall gain can vary from row to row depending on the value of $K_j$ given for the respective rows. This variation in the gain from row to row may be suppressed to a lower level by determining the values for $K_j$ by means of for example linear regression analysis using $\log(P(x_i, y_j))$ ($1 \leq j \leq m$).

Furthermore, a plurality of sets of data in terms of the shading characteristic which are shifted from each other may be obtained using a similar algorithm thereby determining $\log(G(x_i, y_j))$ which is equally contained in all sets of data.

Now, specific embodiments of the invention will be described below. Although in any embodiment described below, the invention is applied to an X-ray image sensing apparatus, the invention is also applicable to other types of image sens ing apparatus.

Embodiment 1

Figure 3:
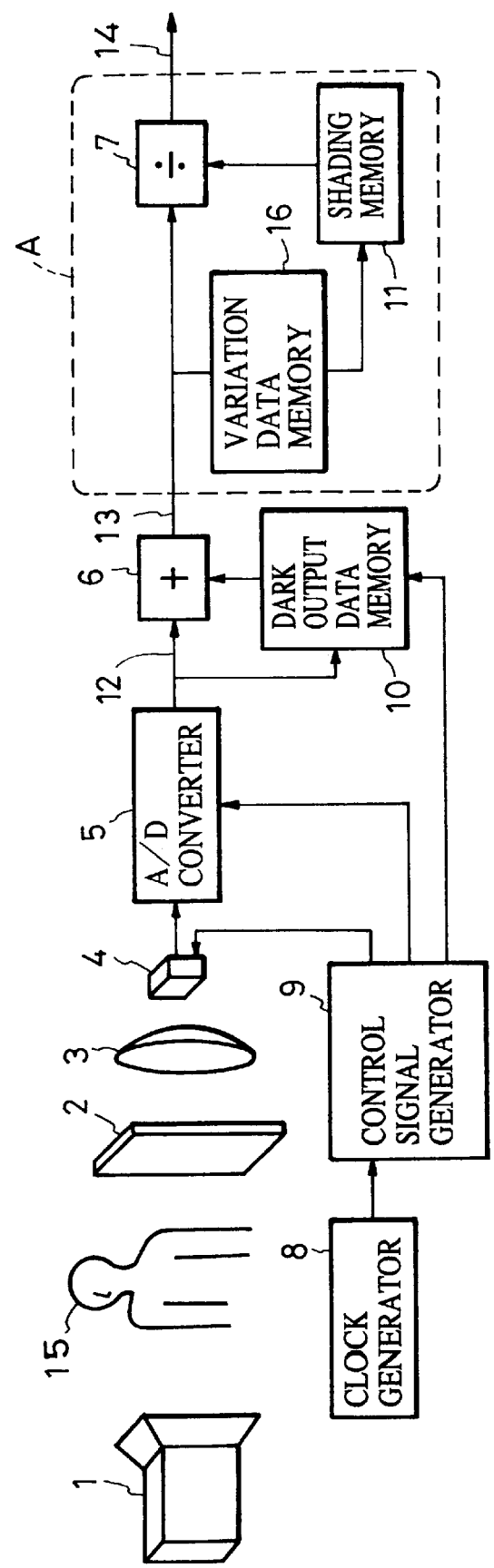

FIG. 3 is a schematic diagram illustrating the construction of an X-ray image sensing apparatus according to the present invention. The construction is similar to that shown in FIG. 1 except that the X-ray image sensing apparatus shown in FIG. 3 includes an additional variation data memory 16 for storing extracted data representing variations G(x, y) in photoelectric conversion efficiency so that in an image sensing operation the variations in the conversion efficiency included in the shading distribution data stored in the memory 11 are corrected by means of dividing operation performed by a divider 7 using the data stored in the memory 16. Other similar parts to those in FIG. 1 will not be described in further detail.

Figure 4:
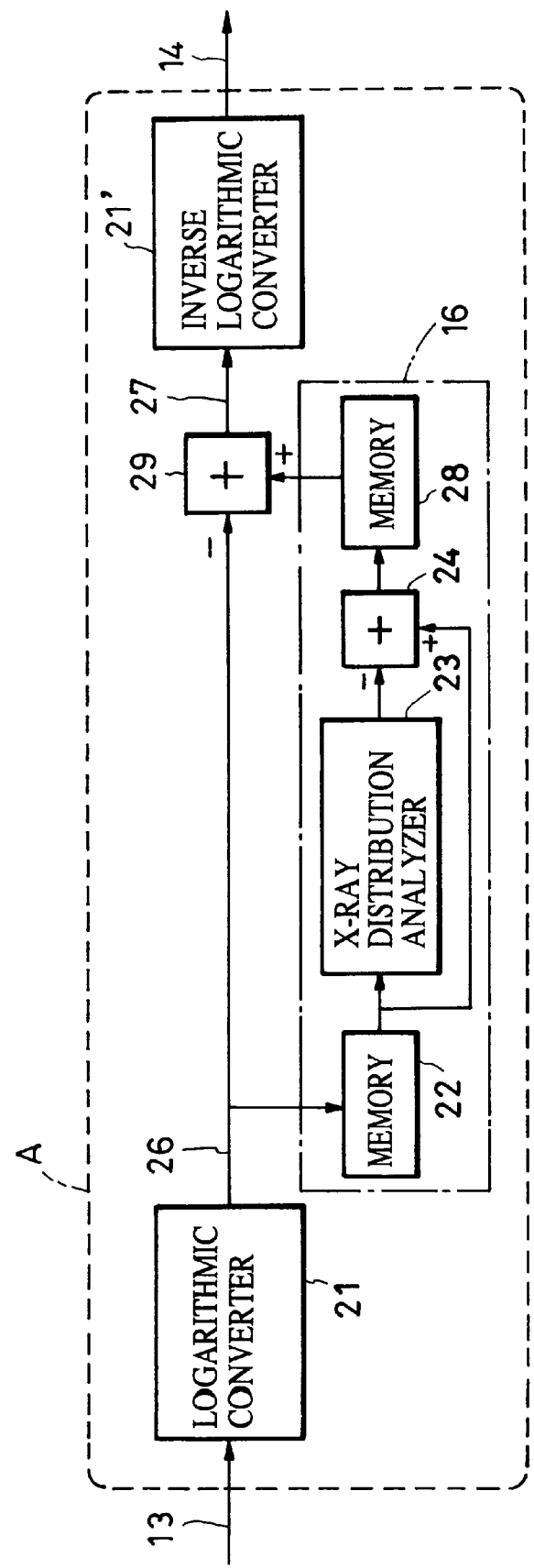
FIG. 4 is a simplified block diagram illustrating a preferred embodiment of a correction unit A.

FIG. 4 is a block diagram illustrating the details of the correction unit A surrounded by a broken line in FIG. 3.

In FIG. 4, data whose dark component has been removed is applied to a correction unit A via a signal line 13. Reference numeral 21 denotes a logarithmic converter which usually operates using a reference table. Reference numeral 22 denotes a memory for temporarily storing an image obtained under the condition that there is no object such as a human body to be examined. Reference numeral 23 denotes a device for detecting the X-ray radiation intensity distribution which usually has a gradually-varying shape. A subtractor 24 determines the variation in the conversion efficiency of the photoelectric conversion elements, which corresponds to the difference from the original data. The resultant data is stored in a memory 28.

When the image of an object such as a human body to be examined is actually sensed, the image signal is supplied to the logarithmic converter (reference table) 21 via the signal line 13. The logarithmic converter 21 converts the received data into the form of the sum of the X-ray intensity distribution and the variation in the conversion efficiency as represented in equation (3). A subtractor 29 subtracts the logarithm of the conversion efficiency stored in the memory 28 from the image signal so as to correct the conversion efficiency thereof while no correction as to the X-ray intensity distribution is made.

The corrected data in the form of logarithm is output over a signal line 27. To convert the logarithmic data into the original linear form, there is provided an inverse logarithmic converter 21' which operates for example using a reference table. Thus, an image signal which has been corrected in terms of only the variations in the conversion efficiency is output over a signal line 14.

The device 23 for detecting the X-ray radiation intensity distribution can be easily realized using for example a microprocessor programmed to perform function approximation according to any of the methods described above. It is desirable that the approximation method be properly selected so that the overall characteristics of the system (including the X-ray generator) are optimized. Alternatively, the device 23 may also be realized by means of hardware such as a two-dimensional low-pass filter.

Note that the data stored in the memory 23 represents not only the variations in the conversion efficiency of the respective photoelectric conversion elements of the solid state sensor but the data represents the overall variations including the variations in the characteristics of other devices such as a fluorescent plate and a plurality of amplifiers disposed at the output stage of the photoelectric conversion elements.

Embodiment 2

Figure 5:
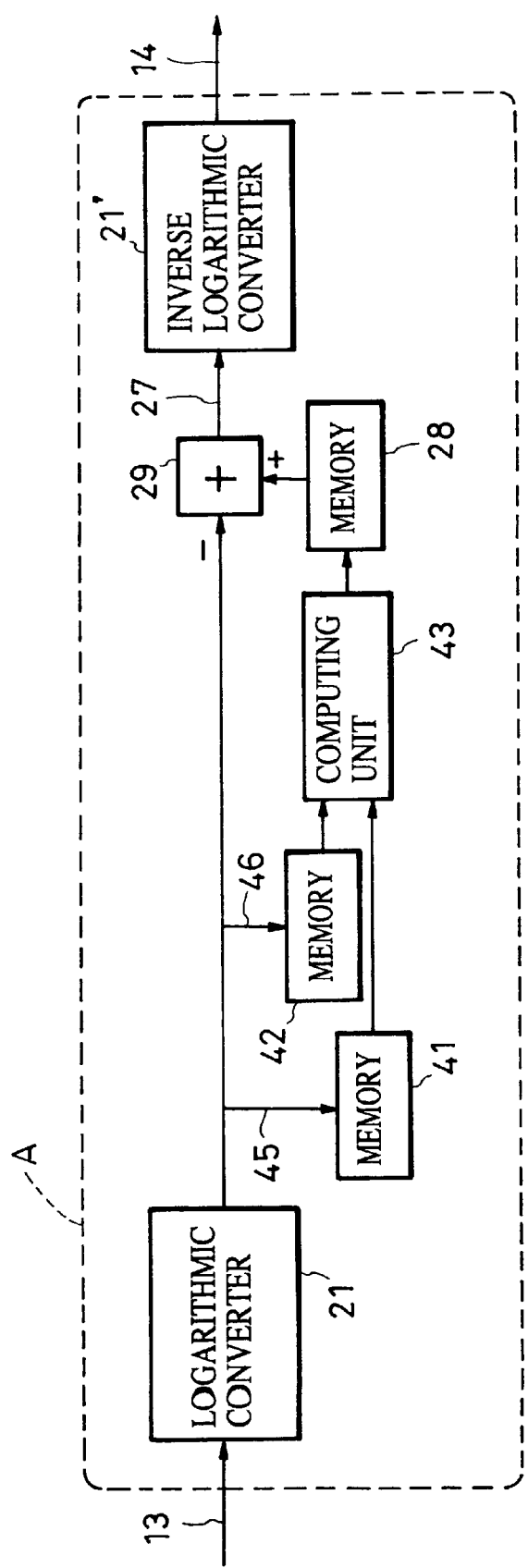
FIG. 5 is a simplified block diagram illustrating another preferred embodiment of the correction unit A.

FIG. 5 is a block diagram illustrating a second embodiment of the invention, wherein, of various components, only a correction unit A surrounded by a broken line is shown in the figure. The differences from FIG. 4 will be described below. Reference numeral 41 denotes a memory for storing first shading distribution data, and reference numeral 42 denotes a memory for storing second shading distribution data. The first shading distribution data corresponds to $\log(P(x_i, y_j))$ described above in equation (5). The second shading distribution data corresponds to $\log(P'(x_i, y_j))$ described above in equation (6). A computing unit 43 determines the variations in the conversion efficiency from element to element by performing the calculation described above in equation (8) using the shading distribution data read from the memories 42 and 42. The resultant data is stored in memory 28.

First, image data is obtained when there is no object such as a human body to be examined, and the obtained image data is converted by the converter 21 to data in the logarithm form. The result is stored via a signal line 45 in the memory 41 serving to store first shading distribution data. Then, the solid state image sensing apparatus is moved by an amount corresponding to one pixel in the x direction, and an image is sensed also under the condition that there is no object such as a human body to be examined. The image data obtained is stored via a signal line 46 in the memory 42 serving to store second shading distribution data.

After that, the computing unit 43 sequentially reads data from the memories 41 and 42 and the performs the calculation represented by equation (8). The resultant data representing the variations in the conversion efficiency from one element to another is stored in the memory 28.

In this embodiment, as in the previous embodiment, the above calculations may be performed by a programmed microcomputer consisting of a CPU, a ROM for storing a program, and other devices.

The operation of sensing image data of an object such as a human body to be examined may be performed in a similar manner to the first embodiment described above.

The present embodiment may be modified such that a plurality of sets of shading data which are shifted in position from each other are measured and the variations in the conversion efficiency are determined by extracting such components which are equally contained in all data sets.

The initial values for $K_j$ in equation (8) may be determined, as described above, on the basis of an expected distribution in the y direction.

Figure 6:
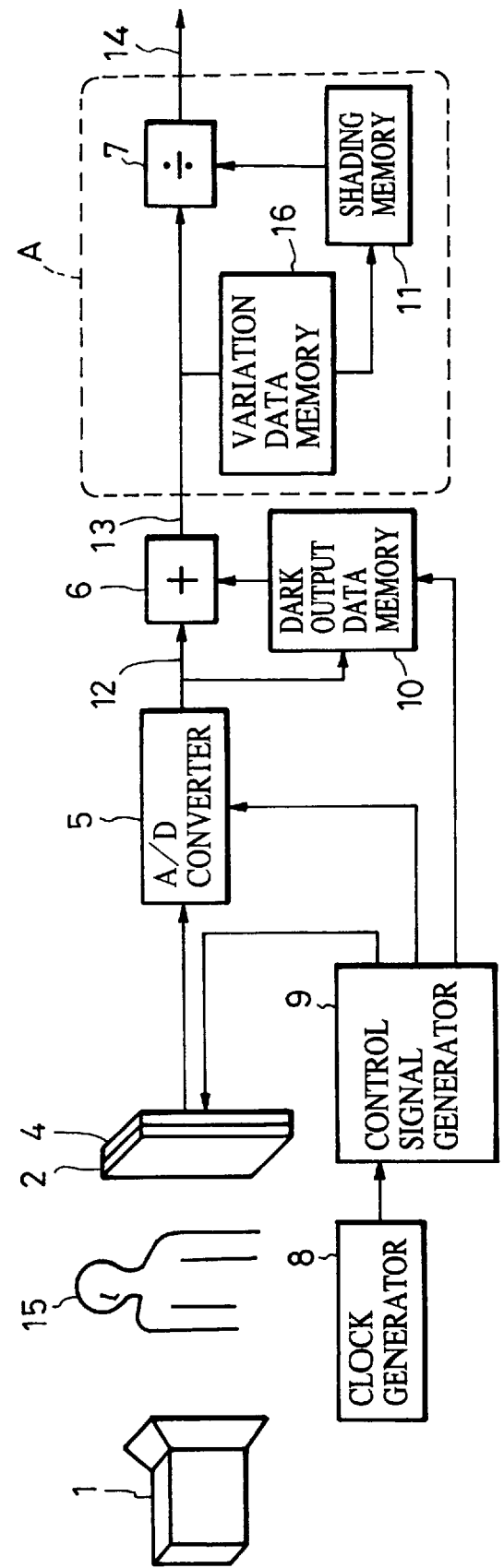

In the embodiments described above, the apparatus is assumed to have the structure shown in FIG. 3. However, the present invention may also be applied to any system including a solid state image sensor having variations in the conversion efficiency. For example, the invention may be applied to such a system shown in FIG. 6 which includes no optical system such as the optical system 3 shown in FIG. 3 but which includes a large-sized solid state image sensor disposed in direct contact with a fluorescent plate. Furthermore, the optical system 3 shown in FIG. 3 is not limited to a lens but it may also be a light guiding element (such as an optical fiber).

In the above embodiments, the variations in the conversion efficiency of the photoelectric conversion. elements are extracted on the assumption that the X-ray intensity has a gradually-varying distribution. Instead, the variation in the conversion efficiency may also be extracted from image data obtained by taking an image of an object having a known X-ray transmission characteristic. In particular, this method is useful when it is coupled with the technique disclosed in the second embodiment, because if the X-ray intensity distribution is nearly flat, it is difficult to extract the variations in the conversion efficiency using the technique according to the second embodiment.

As can be understood from the above description, the present invention has various advantages. That is, the invention provides a technique of separating the component of the incident ray intensity distribution from the initial shading data of the apparatus which has been set to arbitrary initial conditions thereby extracting the pixel-to-pixel variations in the conversion efficiency of a solid state image sensor. A sensed image is corrected in such a manner that only the variations in the photoelectric conversion efficiency are corrected on the basis of the above-described extracted data without making any correction in terms of the X-ray intensity distribution. This prevents an artifact from occurring in the corrected image data.

Furthermore, in the present invention, when an image such as an X-ray image is taken through a solid state image sensing apparatus including a plurality of photoelectric conversion elements, even if the X-ray intensity distribution varies due to movement in position of the X-ray generator or the solid state image sensor, no artifact such as unnaturally sloped shading occurs because correction is performed only in the terms of the variations in the conversion efficiency of the photoelectric conversion elements.

What is claimed is:

1. A method of sensing and object image using an image sensing apparatus provided with a solid state image sensor having a plurality of pixels, said method comprising the steps of:

separating a component of an electromagnetic wave radiation intensity distribution from distribution data obtained when an electromagnetic wave is incident on said solid state image sensor, without an object being on said solid state image sensor, thereby obtaining a pixel-to-pixel variation distribution of a conversion efficiency of said solid state image sensor; and correcting image data obtained in an image sensing operation on an object placed on said image sensor on a basis of the pixel-to-pixel variation distribution of the conversion efficiency.

2. A method of sensing an image, according to claim 1, wherein said electromagnetic wave is an X-ray.

3. A method of sensing an image, according to claim 1, wherein said step of separating the radiation intensity distribution is accomplished by passing said distribution data through a two-dimensional low-pass filter thereby achieving said separation.

4. A method of sensing an image using an image sensing apparatus provided with a solid state image sensor having a plurality of pixels, said method comprising the steps of:

separating the component of an electromagnetic wave radiation intensity distribution from distribution data obtained when an electromagnetic wave is incident on said solid state image sensor thereby obtaining a pixel-to-pixel variation distribution of the conversion efficiency of said solid state image sensor; and correcting image data obtained in an image sensing operation, on the basis of said pixel-to-pixel variation distribution of the conversion efficiency, wherein said step of separating the radiation intensity distribution is accomplished by determining a function including separate terms approximately representing said radiation distribution and said variation distribution of the conversion efficiency, respectively, thereby separating said radiation distribution.

5. A method of sensing an image using an image sensing apparatus provided with a solid state image sensor having a plurality of pixels, said method comprising the steps of:

separating the component of an electromagnetic wave radiation intensity distribution from distribution data obtained when an electromagnetic wave is incident on said solid state image sensor thereby obtaining a pixel-to-pixel variation distribution of the conversion efficiency of said solid state image sensor; and correcting image data obtained in an image sensing operation, on the basis of said pixel-to-pixel variation distribution of the conversion efficiency, wherein said step of separating the radiation intensity distribution is accomplished by: measuring said distribution data for a plurality of shifted positions of said solid state image sensor; extracting, from said distribution data obtained for said plurality of shifted positions, a component which remains unchanged regardless of the shift in the position of said solid state image sensor; and employing the obtained component as the variation distribution of the conversion efficiency.

6. A method of sensing an image using an image sensing apparatus provided with a solid state image sensor having a plurality of pixels, said method comprising the steps of:

separating the component of an electromagnetic wave radiation intensity distribution from distribution data obtained when an electromagnetic wave is incident on said solid state image sensor thereby obtaining a pixel-to-pixel variation distribution of the conversion efficiency of said solid state image sensor; and correcting image data obtained in an image sensing operation, on the basis of said pixel-to-pixel variation distribution of the conversion efficiency, wherein said step of separating the radiation intensity distribution is accomplished by determining a function including separate terms approximately representing said radiation distribution and said variation distribution of the conversion efficiency, respectively, thereby separating said radiation distribution, and wherein said determination of the function includes the step of performing non-linear regression analysis.

7. A method of sensing an image using an image sensing apparatus provided with a solid state image sensor having a plurality of pixels, said method comprising the steps of:

separating the component of an electromagnetic wave radiation intensity distribution from distribution data obtained when an electromagnetic wave is incident on said solid state image sensor thereby obtaining a pixel-to-pixel variation distribution of the conversion efficiency of said solid state image sensor; and correcting image data obtained in an image sensing operation, on the basis of said pixel-to-pixel variation distribution of the conversion efficiency, wherein said step of separating the radiation intensity distribution is accomplished by determining a function including separate terms approximately representing said radiation distribution and said variation distribution of the conversion efficiency, respectively, thereby separating said radiation distribution, and wherein said determination of the function includes the step of performing regression analysis.

8. An image sensing apparatus comprising a solid state image sensor having a plurality of pixels, said apparatus comprising:

means for separating a component of an electromagnetic wave radiation intensity distribution from distribution data obtained when the electromagnetic wave is incident on said solid state image sensor, without an object being on said solid state image sensor, thereby obtaining a pixel-to-pixel variation distribution data of a conversion efficiency of said solid state image sensor;

means for storing the variation distribution data of the conversion efficiency; and means for correcting image data obtained in an image sensing operation including the irradiation of the electromagnetic wave on an object placed on said image sensor, on a basis of the variation distribution data of the conversion efficiency.

9. An image sensing apparatus according to claim 8, wherein said electromagnetic wave is an X-ray.

10. An image sensing apparatus according to claim 8, wherein said means for separating the radiation intensity distribution includes a two-dimensional low-pass filter whereby said separation is accomplished by passing said shading distribution data through said two-dimensional low-pass filter.

11. An image sensing apparatus according to claim 8, further comprising a wavelength converting member for converting the wavelength of said electromagnetic wave, said wavelength converting member being disposed at the side of said solid state image sensor on which said electromagnetic wavelength is incident.

12. An image sensing apparatus provided with a solid state image sensor having a plurality of pixels, said apparatus comprising:

means for separating the component of an electromagnetic wave radiation intensity distribution from distribution data obtained when an electromagnetic wave is incident on said solid state image sensor thereby obtaining a pixel-to-pixel variation distribution of the conversion efficiency of said solid state image sensor;

means for storing said variation distribution of the conversion efficiency; and means for correcting an image obtained in an image sensing operation, on the basis of said variation distribution of the conversion efficiency, wherein said means for separating the radiation intensity distribution includes means for determining a function including separate terms approximately representing said radiation distribution and said variation distribution of the conversion efficiency, respectively, thereby separating said radiation distribution.

13. An image sensing apparatus provided with a solid state image sensor having a plurality of pixels, said apparatus comprising:

means for separating the component of an electromagnetic wave radiation intensity distribution from distribution data obtained when an electromagnetic wave is incident on said solid state image sensor thereby obtaining a pixel-to-pixel variation distribution of the conversion efficiency of said solid state image sensor;

means for storing said variation distribution of the conversion efficiency; and means for correcting an image data obtained in an image sensing operation, on the basis of said variation distribution of the conversion efficiency, wherein said means for separating the radiation intensity distribution includes means for measuring said distribution data for a plurality of shifted positions of said solid state image sensor, extracting, from said distribution data obtained for said plurality of shifted positions, a component which remains unchanged regardless of the shift in the position of said solid state image sensor, and employing the obtained component as the variation distribution of the conversion efficiency.

* * * * *

UNITED STATES PATENT AND TRADEMARK OFFICE
CERTIFICATE OF CORRECTION

PATENT NO. : 6,219,405 B1
DATED : April 17, 2001
INVENTOR(S) : Hitoshi Inoue

It is certified that error appears in the above-identified patent and that said Letters Patent is hereby corrected as shown below:

Title page,
Item [56], FOREIGN PATENT DOCUMENTS, "08266532" should read
-- 8-266532 --.

Column 1,
Line 54, "subtractor" should read -- subtracter --.

Column 2,
Line 33, "subtractor" should read -- subtracter --;
Line 59, "an" should read -- a --.

Column 3,
Line 63, "no" should read -- any --.

Column 5,
Line 31, "no" should read -- any --;
Line 59, "an" should be deleted.

Column 6,
Line 14, "$H(x,y) = K/\{(x-x_o)^{2+(}y-y_o)^2+L^2\}$" should read
-- $H(x,y) = K/\{(x-x_o)^2+(y-y_o)^2+L^2\}$ --;
Line 32, "$H(x_i, y_i)$" should read -- $H(x_i, y_j)$ --;
Line 33, "$y_i$)" should read -- $y_j$) --;
Line 42, "$P(x_i, y_i)$" should read -- $P(x_i, y_j)$ --;
Line 52, "form" should read -- from --.

Column 7,
Line 7, "E" should read -- $\Sigma$ --;
Line 15, "the" (first occurrence) should read -- The --;
Line 29, "$\log(P'(x_i,y_j))=\log(H(x_{i+1},y_j)) + \log(G(x_i,y_j)))$" should read -- $\log(P'(x_i,y_j))=\log(H(x_{i+1},y_j)) + \log(G(x_i,y_j))$ --;
Line 37, "$\log(G(x_i,y_j))=\log(P(x_i,y_j))\cdot\log(P'(x_{i-1}, y_j))  +\log(G(x_{i-1}, y_j))$" should read
-- $\log(G(x_i,y_j))=\log(P(x_i,y_j))\cdot\log(P'(x_{i-1}, y_j))+\log(G(x_{i-1}, y_j))$ --;
Line 55, "sens ing" should read -- sensing --.

UNITED STATES PATENT AND TRADEMARK OFFICE
CERTIFICATE OF CORRECTION

PATENT NO. : 6,219,405 B1
DATED : April 17, 2001
INVENTOR(S) : Hitoshi Inoue

It is certified that error appears in the above-identified patent and that said Letters Patent is hereby corrected as shown below:

Column 8,
Line 14, "subtractor" should read -- subtracter --;
Line 24, "subtractor" should read -- subtracter --.

Column 9,
Line 1, "42 and 42." should read -- 41 and 42. --;
Line 15, "the" (second occurrence) should read -- then --;
Line 47, "conversion." should read -- conversion --.

Signed and Sealed this

Twenty-eighth Day of May, 2002

Attest:

JAMES E. ROGAN
Attesting Officer
Director of the United States Patent and Trademark Office